US012784062B2

(12) United States Patent
Deshpande et al.

(10) Patent No.: US 12,784,062 B2
(45) Date of Patent: Nov. 3, 2026

(54) METHOD AND SYSTEM FOR DETERMINING EMISSION DISTRIBUTION OF A GAS USING A SURROGATE MODEL

(71) Applicant: Tata Consultancy Services Limited, Mumbai (IN)

(72) Inventors: Shailesh Shankar Deshpande, Pune (IN); Garvit Agarwal, Pune (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 19/301,119

(22) Filed: Aug. 15, 2025

(65) Prior Publication Data

US 2026/0065294 A1 Mar. 5, 2026

(30) Foreign Application Priority Data

Aug. 28, 2024 (IN) ............................ 202421065011

(51) Int. Cl.
*G06Q 30/018* (2023.01)
*G06N 3/084* (2023.01)

(52) U.S. Cl.
CPC ........... *G06Q 30/018* (2013.01); *G06N 3/084* (2013.01)

(58) Field of Classification Search
CPC ............................ G06Q 30/018; G06N 3/084
(Continued)

(56) References Cited

U.S. PATENT DOCUMENTS 10,330,593 B1 * 6/2019 Dobler .................. G08B 21/14
12,694,329 B2 * 7/2026 Ramea Kubendran ...................... G06N 20/00
(Continued)

FOREIGN PATENT DOCUMENTS

CN 114324780 A 4/2022
CN 114547553 A 5/2022
(Continued)

OTHER PUBLICATIONS

Brian T. Dinkelackee et al., "High-resolution downscaling of source resolved PM2.5 predictions using machine learning models"; Oct. 1, 2023; Atmospheric Environment vol. 310, Oct. 1, 2023, 119967, 10 pages, (Year: 2023).*
(Continued)

*Primary Examiner* — Shannon S Campbell
*Assistant Examiner* — Freda A Nelson
(74) *Attorney, Agent, or Firm* — Finnegan, Henderson, Farabow, Garrett & Dunner, LLP

(57) ABSTRACT

Obtaining accurate estimates of emission distribution of gases is a technically challenging as well as environmentally relevant problem. Existing techniques have high computational cost, need deep mathematical and computational expertise, and are prone to errors. Hence, embodiments of present disclosure provide a method and system for determining emission distribution using a surrogate model. The method takes prior emission distributions of gas and updates them using its future concentrations in the atmosphere by using a trained surrogate of a numerical transport model by maintaining consistency between the emissions, atmospheric transport, and future concentrations. The surrogate model is trained in a data-driven way to improve transport models, which is less complicated and time-consuming than
(Continued)

correcting the parameterizations and constants used in numerically modeling various processes in transport.

12 Claims, 7 Drawing Sheets

(58) Field of Classification Search
USPC .......................................................... 705/317
See application file for complete search history.

(56) References Cited

U.S. PATENT DOCUMENTS

| | | | | |
|---|---|---|---|---|
| 2018/0210469 | A1 * | 7/2018 | Du | G06Q 10/00 |
| 2023/0119608 | A1 * | 4/2023 | Gains | G01N 33/0032 |
| 2024/0210916 | A1 * | 6/2024 | Trejo | G05B 19/4155 |

FOREIGN PATENT DOCUMENTS

| | | | | | |
|---|---|---|---|---|---|
| CN | 115481558 | A | * | 12/2022 | G06F 30/23 |
| CN | 116862818 | A | | 10/2023 | |
| TW | 202336461 | A | * | 9/2023 | |

OTHER PUBLICATIONS

Correia, Daniel and Wilke, Daniel N., "How We Solve the Weights in Our Surrogate Models Matters", Jul. 2019, vol. 141 / 074501-1 thru 074501-5, 5 pages (Year: 2019).*
J. D. Le Brazidec et al., "Deep learning applied to CO2 power plant emissions quantification using simulated satellite images", Geosci. Model Dev., 17, 1995-2014, 2024.

* cited by examiner

METHOD AND SYSTEM FOR DETERMINING EMISSION DISTRIBUTION OF A GAS USING A SURROGATE MODEL

PRIORITY CLAIM

This U.S. patent application claims priority under 35 U.S.C. § 119 to: Indian Patent Application number 202421065011, filed on Aug. 28, 2024. The entire contents of the aforementioned application are incorporated herein by reference.

TECHNICAL FIELD

The present invention generally relates to the field of atmospheric science, and, more particularly, to a method and system for determining emission distribution of a gas using a surrogate model.

BACKGROUND

Two of the major environmental issues, air pollution and global warming, are the results of the excess emission of certain harmful gases, like $CO_2$, $CH_4$, CO, $SO_x$, $NO_x$ into the atmosphere due to human activities. Treaties and agreements, especially for global warming have been established, like the Kyoto Protocol and Paris Agreement, which aim to set emission reduction targets for countries. Hence, to assess the effectiveness as well as the adherence by countries to these policies, governments and industries alike are interested in estimating the distribution of emissions of these gases on the surface of the Earth. To do this, broadly there are two classes of methods: i) bottom-up methods and ii) top-down methods. The bottom-up methods involve gathering detailed data on individual sources, activities, and technologies to estimate the emissions at different locations. These methods rely on 1) comprehensive inventory of sources from a wide range, including industrial facilities, power plants, transportation, agriculture, and residential activities, 2) the associated emission factors (coefficients that relate the quantity of pollutants or gas emitted to a specific activity level), and 3) the activity data that represents the level of a particular activity that is associated with pollutant or greenhouse gas emissions. The top-down methods involve measuring concentrations of the gas or pollutant in the atmosphere and inferring the sources of those concentrations with the help of transport models. A large number of atmospheric transport and chemistry models have been developed that can predict the future concentrations of the gas given its past surface emission distribution. They model various processes like advection, convection, planetary boundary layer turbulence, diffusion, surface deposition, cloud convection, chemical reactions, etc. These models can go forward in time, but the problem of estimating the emission distribution of the gas using measurements of its atmospheric concentrations has no analytical solution and neither is the solution unique (since the problem is mathematically underdetermined). However, using certain data assimilation algorithms, it is possible to solve the problem. These algorithms take a prior estimate of the emissions to deal with the non-uniqueness and iteratively update this prior to arrive at the more accurate emission distribution.

Two major algorithms that have been widely using the top-down approach are the Ensemble Kalman Filter (EnKF) and the 4-D Variational (4D Var) methods. The idea behind both algorithms is to estimate a state vector using a time-series of observations (concentrations). In the Kalman Filter, a Bayesian framework is used to update the prior (and its uncertainties) using the concentrations and the new estimate is called the posterior. This Bayesian update step is followed by advancing the model in time (using a transport model), then incorporating new concentration data in a Bayesian update step and so on. In the 4-D Variational algorithm, the state is estimated by minimizing a cost function that is a function of the prior state, a transport model, and the observations within a fixed time duration called the 'assimilation window'. Typically, the cost function considers the state's deviation from the prior estimate as well as the new observations and these 2 terms are weighted by the uncertainties in the prior and the measurements, respectively. The cost function is minimized using a gradient descent algorithm. The observational concentration data that are used in these methods can come from measurements from ground-based stations or from satellites.

The bottom-up methods can provide detailed information, sector specific insights and granular understanding of the emissions. However, collecting and processing detailed data from various sources is a complex and costly undertaking; on the other hand, they may not capture all the sources of emissions. There can also be potentially high uncertainties associated with emission factors or activity data. There is heavy dependence on assumptions, and crucially, they have limited applicability in remote areas or developing countries where data collection infrastructure may be lacking. On the other hand, the top-down methods can exploit the global coverage granted when satellite measurements are used. They consider all sources of emission, known or unknown, and they open up the possibility of near-real-time monitoring. However, performing high-dimensional optimization (e.g. in 4D-Var) or running large ensembles of model simulations (e.g. in ensemble Kalman filter) is computationally expensive, especially when working with fine resolution. Moreover, these algorithms involve complex mathematical formulations and integrating them with atmospheric transport models involves coupling complex numerical codes. Implementing these algorithms requires a deep understanding of the underlying mathematics and computational methods, and hence poses a big barrier. Furthermore, atmospheric transport models contain uncertainties and errors arising from simplifications in model physics, parameterizations (of processes like surface-layer turbulence, chemistry etc.), and numerical approximations. Assimilating observations into such models may propagate and amplify these uncertainties, leading to inaccurate estimates of emission distributions.

Deep learning is increasingly used in the atmospheric and geoscience community owing to their demonstrated great ability in capturing non-linearities in a system that are a major part of atmospheric transport and estimation of emissions. Deep learning models automatically learn relevant features and representations from the data, eliminating the need for manual feature engineering or domain-specific knowledge. They are also adept at capturing complex spatio-temporal patterns, are known to be scalable, and are highly parallelizable using GPUs, making them much faster than the above-mentioned data assimilation methods. Moreover, their ability to capture complex patterns and ease of fine-tuning makes it possible for them to overcome the model errors and uncertainties of the numerical transport models. Hence, deep learning has been employed in the problem of estimating emissions of gases like $NO_2$, $CO_2$ and other air pollutants. Some of the existing works use deep learning computational graphs framework to encode the numerical equations of atmospheric transport and build an inversion framework with that. However, the actual emissions may not always follow the numerical equations leading to inaccuracies in the trained model. In some other works, after training the neural network, concentration measurements from ground-based stations are used as the basis to update and improve upon the prior emission estimates. While ground-based measurements can provide high spatial and temporal resolution and are easier to calibrate and monitor, they have limited spatial coverage, and it is challenging to fetch the data from remote and inaccessible areas.

SUMMARY

Embodiments of the present disclosure present technological improvements as solutions to one or more of the above-mentioned technical problems recognized by the inventors in conventional systems. For example, in one embodiment, a method for determining emission distribution of a gas using a surrogate model is provided. The method includes obtaining i) an initial estimate of emission distribution of a gas over an area, ii) a plurality of meteorological conditions of the area, iii) a plurality of prior concentrations of the gas, and iv) a satellite data of current concentration of the gas over the area. Further, the method includes updating the initial estimate of emission distribution of the gas in a plurality of iterations until a computed error value between a predicted concentration of the gas by a surrogate model and the satellite data of current concentration of the gas is less than a predefined threshold value. A final estimate of emission distribution of the gas is obtained after the plurality of iterations. At each of the plurality of iterations the initial estimate of emission distribution of the gas is updated by first predicting the concentration of the gas based on an emission distribution of the gas, the plurality of meteorological conditions, and the plurality of prior concentrations of the gas, using the surrogate model. The emission distribution of the gas is equal to the initial estimate of emission distribution in a first iteration. Next, computing the error value between the predicted concentration of the gas and the satellite data of current concentration of the gas. Finally, updating the initial estimate of emission distribution based on the computed error value. The updated estimate of emission distribution is used in subsequent iteration.

In another aspect, a system for determining emission distribution of a gas using a surrogate model is provided. The system includes: a memory storing instructions; one or more communication interfaces; and one or more hardware processors coupled to the memory via the one or more communication interfaces, wherein the one or more hardware processors are configured by the instructions to obtain i) an initial estimate of emission distribution of a gas over an area, ii) a plurality of meteorological conditions of the area, iii) a plurality of prior concentrations of the gas, and iv) a satellite data of current concentration of the gas over the area. Further, the one or more hardware processors are configured by the instructions to update the initial estimate of emission distribution of the gas in a plurality of iterations until a computed error value between a predicted concentration of the gas by a surrogate model and the satellite data of current concentration of the gas is less than a predefined threshold value. A final estimate of emission distribution of the gas is obtained after the plurality of iterations. At each of the plurality of iterations the initial estimate of emission distribution of the gas is updated by first predicting the concentration of the gas based on an emission distribution of the gas, the plurality of meteorological conditions, and the plurality of prior concentrations of the gas, using the surrogate model. The emission distribution of the gas is equal to the initial estimate of emission distribution in a first iteration. Next, computing the error value between the predicted concentration of the gas and the satellite data of current concentration of the gas. Finally, updating the initial estimate of emission distribution based on the computed error value. The updated estimate of emission distribution is used in subsequent iteration.

In yet another aspect, there are provided one or more non-transitory machine-readable information storage mediums comprising one or more instructions which when executed by one or more hardware processors cause a method for determining emission distribution of a gas using a surrogate model. The method includes obtaining i) an initial estimate of emission distribution of a gas over an area, ii) a plurality of meteorological conditions of the area, iii) a plurality of prior concentrations of the gas, and iv) a satellite data of current concentration of the gas over the area. Further, the method includes updating the initial estimate of emission distribution of the gas in a plurality of iterations until a computed error value between a predicted concentration of the gas by a surrogate model and the satellite data of current concentration of the gas is less than a predefined threshold value. A final estimate of emission distribution of the gas is obtained after the plurality of iterations. At each of the plurality of iterations the initial estimate of emission distribution of the gas is updated by first predicting the concentration of the gas based on an emission distribution of the gas, the plurality of meteorological conditions, and the plurality of prior concentrations of the gas, using the surrogate model. The emission distribution of the gas is equal to the initial estimate of emission distribution in a first iteration. Next, computing the error value between the predicted concentration of the gas and the satellite data of current concentration of the gas. Finally, updating the initial estimate of emission distribution based on the computed error value. The updated estimate of emission distribution is used in subsequent iteration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
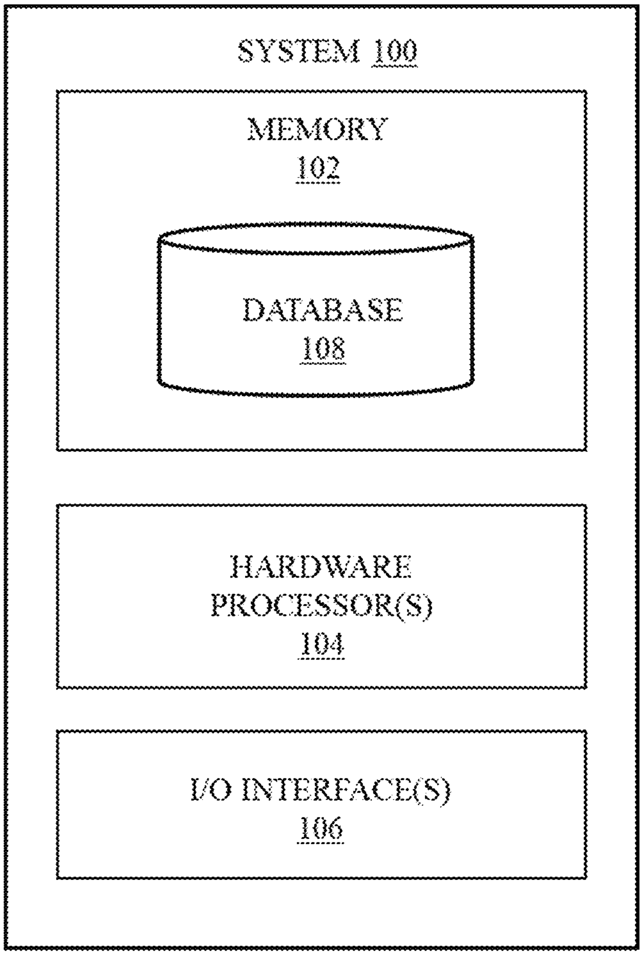
FIG. 1 illustrates an exemplary block diagram for determining emission distribution of a gas using a surrogate model, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As used herein, the 'transport model' is a mathematical or computational tool used to simulate the transport, dispersion and chemical transformation of gases in the atmosphere. As used herein, the term 'surrogate', 'surrogate model', 'digital twin', and 'transport twin', are interchangeably used throughout the detailed description and mean a deep neural network trained to approximate the behavior of the transport model which is usually complex and computationally intensive.

Obtaining accurate estimates of the distribution of surface emissions of gases like $CO_2$, $NO_2$, CO, etc., is a technically challenging as well as environmentally relevant problem. Existing frameworks such as the Ensemble Kalman Filter (EnKF) have their own strengths owing to their strong theoretical foundation and scope of uncertainty quantification. However, they also face some prohibitive challenges, like high computational cost, deep mathematical and computational expertise, and errors arising from various numerical simplifications and parameterizations. Deep learning techniques have been used in the art for estimation of distribution of surface emissions, but they encode differential equations that describe the atmospheric dynamics. However, the actual emissions may not always follow the numerical equations leading to inaccuracies in the trained model. Instead of encoding the equations directly into the neural network, training data generated from numerical transport models may be used. Since numerical transport models use actual physics in their predictions of concentrations, they would be more reliable. One of the existing techniques uses concentration measurements from ground-based stations for updating the prior emission estimates but the ground-based measurements have limited coverage area. On the other hand, satellites offer a much superior spatial coverage providing us data from remote and inaccessible areas. Moreover, the numerical transport model and concentration measurements are assumed to be 100% correct and their approximations and uncertainties are ignored. Hence there is a need to implement a deep learning solution that employs a reliable numerical transport model, uses satellite measurements of concentrations, estimates emissions maintaining consistency between the transport model and satellite measurements, performs this on a very high grid resolution, and overcomes the limitations in accuracy of the transport model as well the satellite measurements.

Embodiments of present disclosure provide a method and system for determining emission distribution of a gas using a surrogate model. The method discloses a dual optimization scheme which involves training a surrogate of the numerical transport model and simultaneously correcting the prior emissions. The constraint in the optimization is the satellite values of gas concentrations. The predicted concentrations from the surrogate model should match them as closely as possible. This dual optimization gives the neural network enough flexibility for it to correct the inaccuracies in the transport model (as well as the emissions) in order to minimize the loss. This is a data-driven way to improve transport models, which is less complicated and time-consuming than correcting the parameterizations and constants used in numerically modeling various processes in transport.

Referring now to the drawings, and more particularly to FIGS. 1 to 9, where similar reference characters denote corresponding features consistently throughout the figures, there are shown preferred embodiments, and these embodiments are described in the context of the following exemplary system and/or method.

FIG. 1 illustrates an exemplary block diagram of a system for determining emission distribution of a gas using a surrogate model, according to some embodiments of the present disclosure. In an embodiment, the system 100 includes one or more processors 104, communication interface device(s) 106 or Input/Output (I/O) interface(s) 106 or user interface 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. The memory 102 may include any computer-readable medium known in the art including, for example, volatile memory, such as Static Random-Access Memory (SRAM) and Dynamic Random-Access Memory (DRAM), and/or non-volatile memory, such as read only memory (ROM), erasable programmable ROM, flash memories, hard disks, optical disks, and magnetic tapes. The database 108 stores information pertaining to inputs fed to the system 100 and/or outputs generated by the system (e.g., at each stage), specific to the methodology described herein. Functions of the components of system 100 are explained in conjunction with flow diagram depicted in FIG. 2 for determining emission distribution of a gas using a surrogate model.

Figure 2:
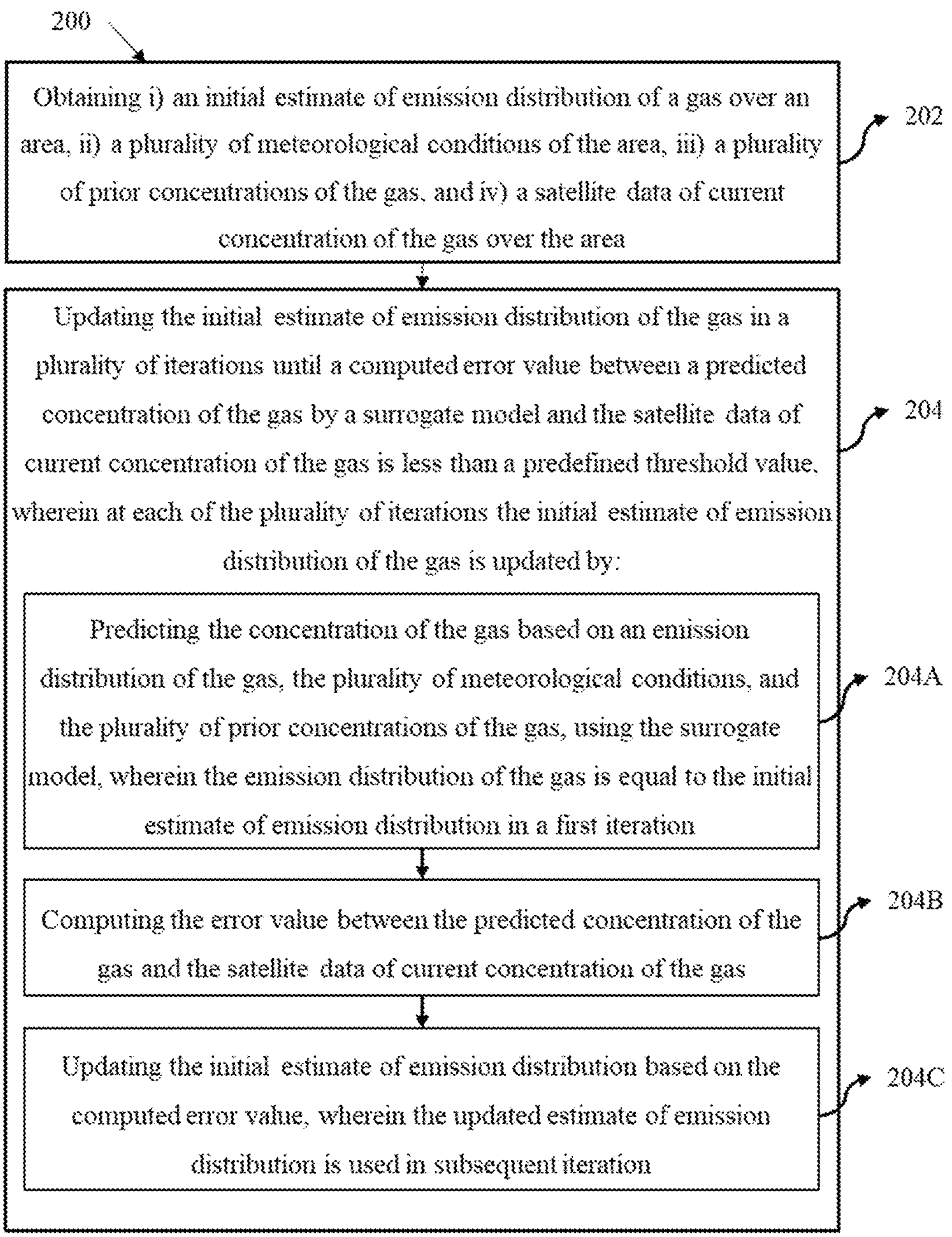
FIG. 2 is a flow diagram illustrating a method for determining emission distribution of a gas using a surrogate model, according to some embodiments of the present disclosure.

In an embodiment, the system 100 comprises one or more data storage devices or the memory 102 operatively coupled to the processor(s) 104 and is configured to store instructions for execution of steps of the method 200 depicted in FIG. 2 by the processor(s) or one or more hardware processors 104. The steps of the method of the present disclosure will now be explained with reference to the components or blocks of the system 100 as depicted in FIG. 1, the steps of flow diagram depicted in FIG. 2, block diagrams of FIGS. 3 to 5 and experimental results of FIGS. 6 to 9, for determining emission distribution of a gas using a surrogate model. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

FIG. 2 is a flow diagram illustrating a method for determining emission distribution of a gas using a surrogate model, according to some embodiments of the present disclosure. At step 202, the one or more hardware processors 104 are configured to obtain i) an initial estimate of emission distribution of a gas over an area, ii) a plurality of meteorological conditions of the area, iii) a plurality of prior concentrations of the gas, and iv) a satellite data of current concentration of the gas over the area. The gas may be any atmospheric gas such as carbon dioxide ($CO_2$), Sulphur dioxide ($SO_2$) and the like. The initial estimate of the emission distribution of the gas (alternatively referred to as prior emissions) is obtained from bottom-up inventory-based methods or remote sensing observations and analyses. The satellite data of the concentrations of the gas are total-column measurements produced using vertical averaging kernels, so the data will be 2-dimensional. Satellite data is used in embodiments of present disclosure (as compared to ground-stations-based measurements used in most of the prior arts) since it offers a much superior spatial coverage providing us data from remote and inaccessible areas.

Further, at step 204 of the method 200, the one or more hardware processors 104 are configured to update the initial estimate of emission distribution of the gas in a plurality of iterations until a computed error value between a predicted concentration of the gas by a surrogate model and the satellite data of current concentration of the gas is less than a predefined threshold value. A final estimate of emission distribution of the gas is obtained after the plurality of iterations. At each of the plurality of iterations the initial estimate of emission distribution of the gas is updated by performing steps 204A to 204C (also illustrated in FIG. 4). At step 204A, the concentration of the gas is predicted based on an emission distribution of the gas, the plurality of meteorological conditions, and the plurality of prior concentrations of the gas, using the surrogate model. The emission distribution of the gas is equal to the initial estimate of emission distribution in a first iteration. In an embodiment, the predicted concentration of the gas is over a 3D grid. Hence, it is converted into total-column (2D grid of concentration) using the same averaging kernels as used for and provided by the satellite data. Next at step 204B, the error value between the predicted concentration of the gas and the satellite data of current concentration of the gas is computed. At step 204C, the initial estimate of emission distribution is updated based on the computed error value. The updated estimate of emission distribution is used in subsequent iteration. Once the plurality of iterations are completed, the final estimate of emission distribution is obtained.

Figure 3:
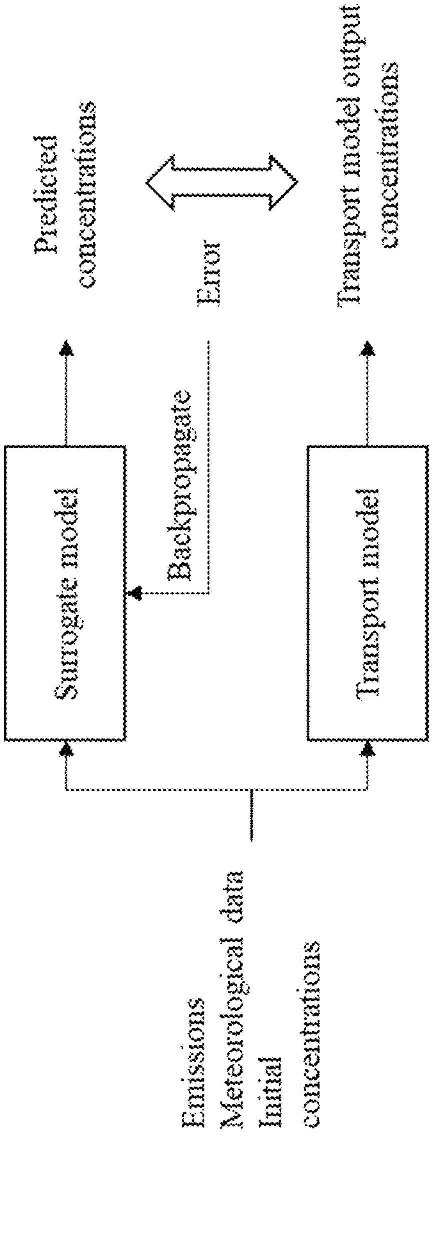
FIG. 3 is a block diagram for training the surrogate model, according to some embodiments of the present disclosure.
Figure 4:
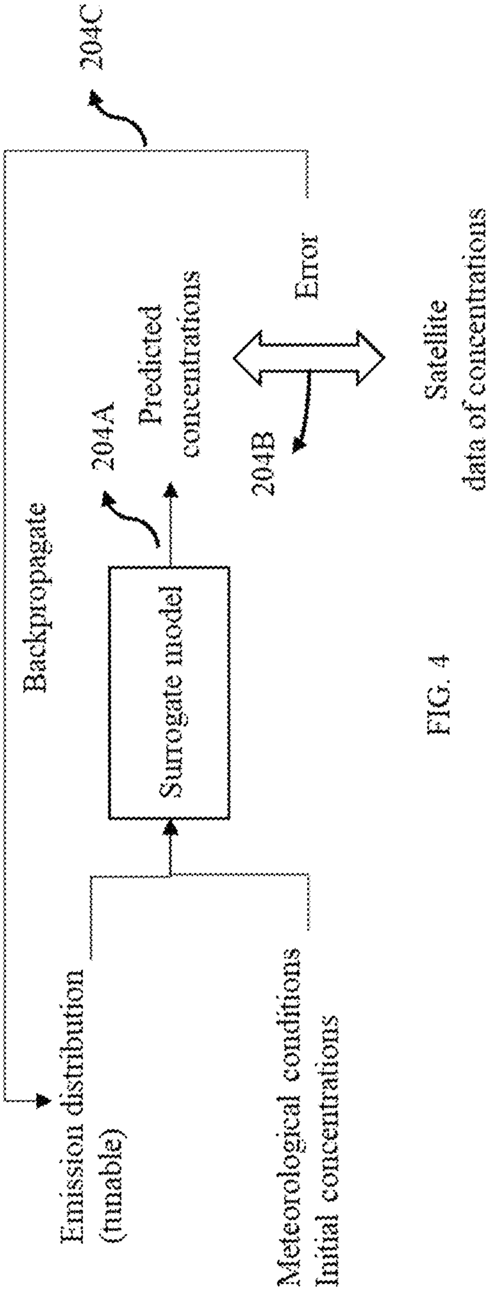
FIG. 4 is a block diagram for updating initial estimate of carbon emissions using the surrogate model according to method of FIG. 2, according to some embodiments of the present disclosure.

FIG. 3 is a block diagram for training the surrogate model, according to some embodiments of the present disclosure. A plurality of the meteorological conditions of the region, a plurality of the emission distributions of the gas in the region and a plurality of past concentrations of the gas in the region are obtained as input to a transport model and the surrogate model. A plurality of future concentrations of the gas in a region is obtained by simulating the transport model with the obtained inputs. Simultaneously, the surrogate model also predicts a plurality of concentrations with the obtained inputs. Then, the surrogate model is trained using a back-propagation technique which updates the weights based on an error between the plurality of concentrations predicted by the surrogate model and the plurality of future concentrations of the gas obtained from the transport model. In an embodiment, a training dataset may be generated by simulating the transport model which comprises multiple input-output pairs. In each of the input-output pairs, input includes different types of meteorological conditions, different values of emission distributions of the gas, and different values of past concentrations of the gas, and output is the concentration obtained from the transport model. A fraction of the training dataset is kept aside as a validation set to gauge the surrogate model's performance on unseen data. During training, parameters (weights) of the surrogate model are updated until the validation error stops decreasing.

Figure 5:
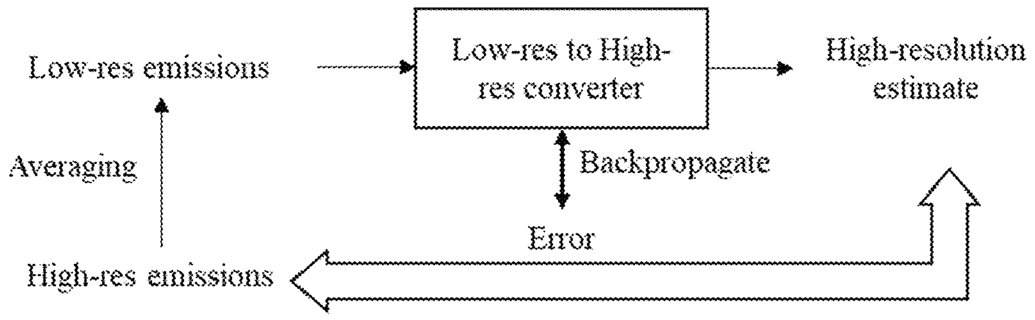
FIG. 5 is a block diagram which depicts a process of training a low-resolution to high-resolution converter, according to some embodiments of the present disclosure.

The resolution of the final estimate of emission distribution that can be obtained from method 200 is limited to the highest resolution of the transport model since the surrogate model is trained using the data generated by the transport model. However, this resolution might not be high enough in situations where even more detailed emission distribution is required, for example, on city-level scales. A different numerical transport model that allows for such high-resolution simulations can be used but then obtaining its surrogate is computationally expensive. Hence in such cases, the final estimate of emission distribution of the gas is transformed into a high-resolution emission distribution by using a low resolution to high resolution converter which is a deep neural network such as an autoencoder. FIG. 5 is a block diagram which depicts process of training the low-resolution to high-resolution converter (depicted as low-res to high-res converter in the figure), according to some embodiments of the present disclosure. In order to train the low-res to high-res converter, a dataset of high-resolution emissions is obtained. Then, a dataset of low-resolution emissions is generated from the dataset of high-resolution emissions by mean-pooling or averaging technique. A deep learning model is trained using the dataset of high-resolution emissions and the dataset of low-resolution emissions to obtain the low-resolution to high-resolution converter.

Experiments and Results

Figure 6:
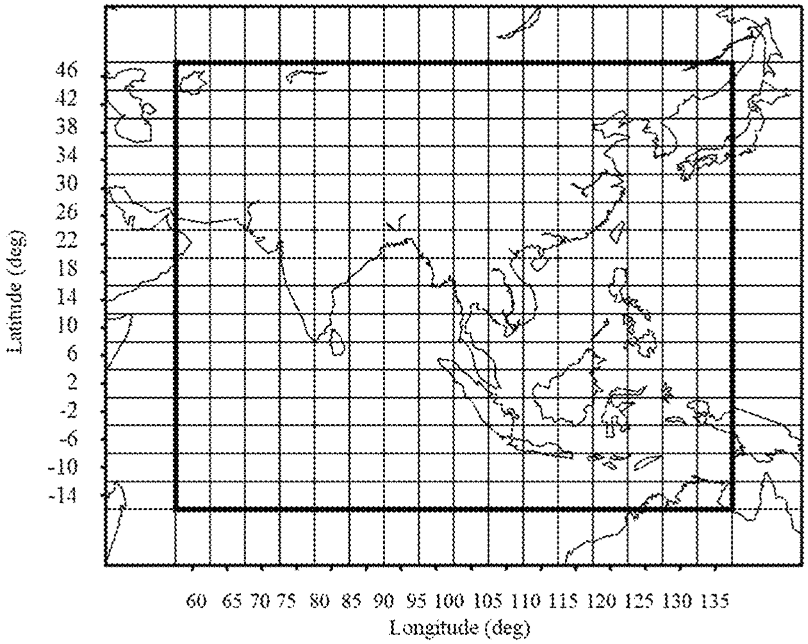
FIG. 6 illustrates an area used for obtaining necessary data for an example implementation of method of FIG. 2, according to some embodiments of the present disclosure.

The method 200 was implemented for studying emission distribution of carbon dioxide gas ($CO_2$) over a region (illustrated in FIG. 6). The choice of gas was determined by i) ease of availability of good quality concentration data (from satellites for example), (ii) the fact that $CO_2$ does not react chemically in the atmosphere, especially on the scale of a few days, and (iii) because of its huge relevance to global warming. The prior emissions were obtained from the ODIAC (Open-source Data Inventory for Anthropogenic CO2) dataset [T. Oda and S. Maksyutov. 2011. *A very high-resolution* (1 *km*×1 *km*) *global fossil fuel* $CO_2$ *emission inventory derived using a point source database and satellite observations of nighttime lights. Atmospheric Chemistry and*

*Physics* 11, 2 (2011), 543-556. https://doi.org/10.5194/acp-11-543-2011], which provides high-resolution global maps of fossil fuel $CO_2$ emissions. The dataset was constructed through a multi-step process that integrates (i) national emissions inventories, (ii) global power plant databases and (iii) satellite observations of nightlight data. The satellite data of $CO_2$ concentrations were obtained from the OCO_L2_Lite_FP data product of NASA's OCO-2 satellite. From this dataset, the total-column $CO_2$ concentration measurements and the vertical averaging kernels corresponding to the relevant dates were extracted.

A literature survey of some of the most well-known transport models was conducted. Based on the survey, the model 'GEOSChem' (Isabelle Bey et. al. 2001. *Global Modeling of Tropospheric Chemistry with Assimilated Meteorology: Model Description and Evaluation. Journal of Geophysical Research: Atmospheres* 106 (11 2001) was selected as the transport model to implement the method 200, since it is open source with extensive online documentation, has an active forum on GitHub for any issues and discussion, and it is a very flexible and customizable model. It models various atmospheric processes, like advection, chemistry, aerosol microphysics, radiation, boundary layer turbulence, dry & wet convection, and deposition. A large number of 1-year simulations were performed with GEOS-Chem v14.2.0 to generate the training dataset for the surrogate model. To make things computationally feasible, following simplifications were made: (i) a grid of resolution 4×5° (450×560 km) was used for a region of size about 7200 km×9000 km over Asia ([−14°,46"] in latitude and [60°, 135°] in longitude), so the horizontal grid size is 16× 16 cells (illustrated in FIG. 6); (ii) The surrogate model (deep neural network) is trained to consider only wind-driven advection and ignore other processes (molecular diffusion is considered negligible because of numerical diffusion) and (iii) the transport model predicts concentrations only one day into the future. For different simulations, different sources/sinks distributions were used from various processes like biosphere exchange, fossil fuels, biofuel, ocean exchange etc. taken from real estimates of different sources. The number of unique emission distribution over Asia were maximized by using emissions from all continents and oceans and further augmenting them by rotation, translation, and reflection. The emissions/sinks are in the units kg/m$^2$/s. The meteorological conditions of the year 2019 were used in the simulations and the relevant fields pertaining to advection are the east-west and north-south winds, pressure, and temperature. Further, the 'MERRA-2' data product at horizontal resolution of 4°×5° is used. MERRA-2 is a reanalysis data product from NASA's Global Modeling and Assimilation Office (GMAO).

Figure 7:
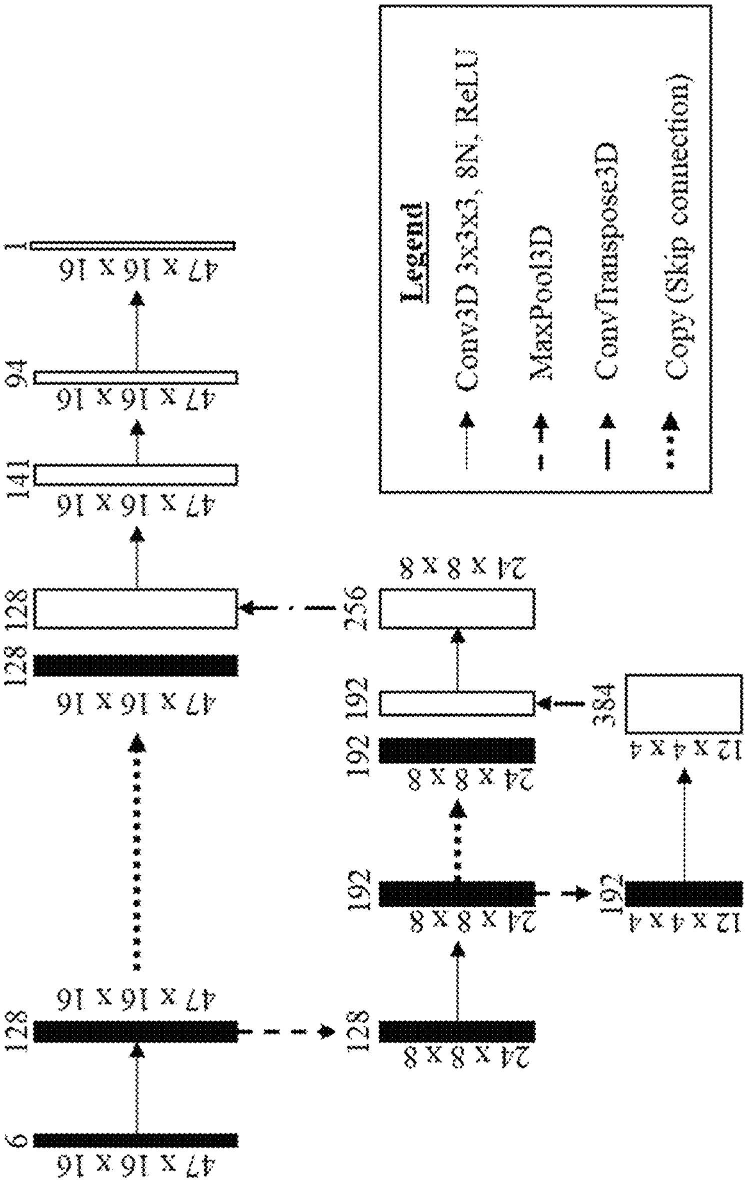
FIG. 7 illustrates an example architecture of the surrogate model, according to some embodiments of the present disclosure.
Figure 8A:
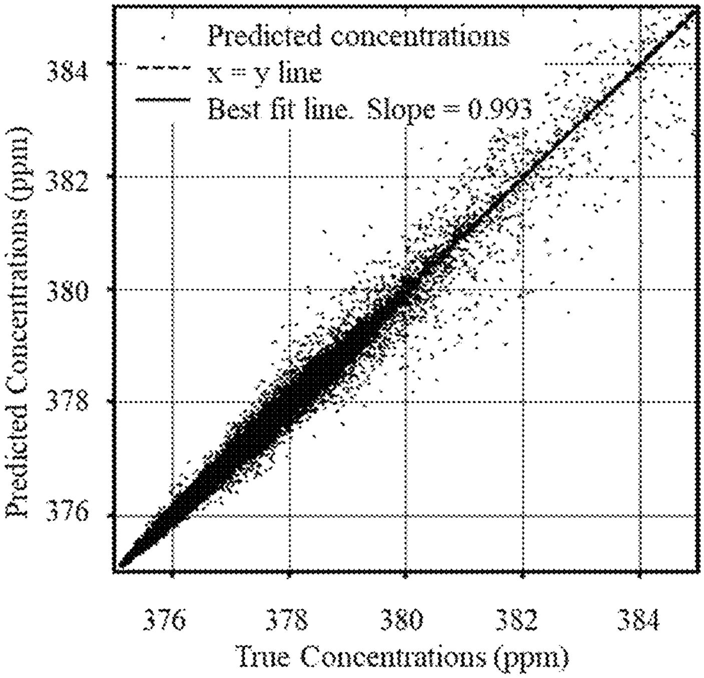
FIGS. 8A and 8B are scatter plots of predicted concentrations against true concentrations, and predicted concentration change against true concentration change, respectively, according to some embodiments of the present disclosure.
Figure 8B:
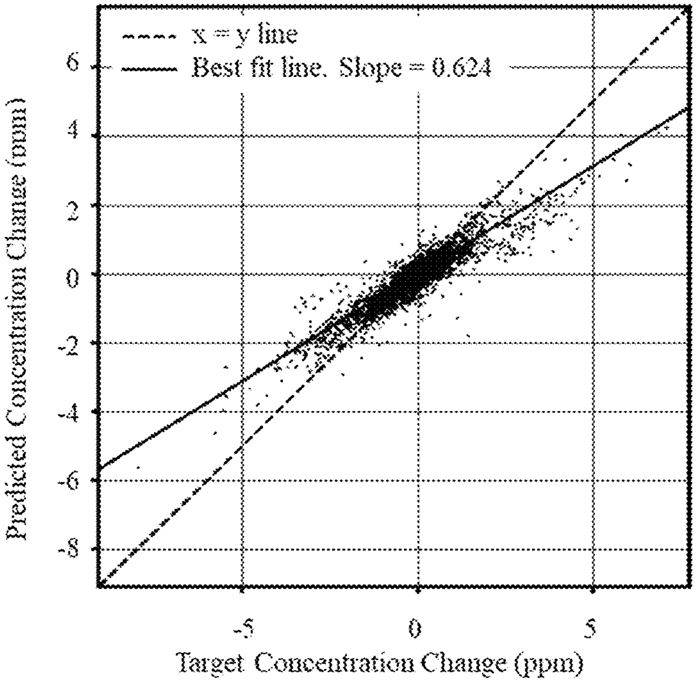

FIG. 7 illustrates an example architecture of the surrogate model, according to some embodiments of the present disclosure. It is a neural network (alternately referred to as network, deep learning model, deep neural network etc.) known as the U-Net architecture, initially designed for medical image segmentation task. It was observed that the encoder-decoder structure of this network is suitable for being the surrogate of the GEOS-CHEM transport model, since the network's output will also be a 3D array. In addition, the skip-connections in the U-Net architecture help significantly in the accuracy and generalization of the network. Input to the network is a 4D tensor of shape 6×47×16×16 where the first dimension (the 'channel' dimension) of size 6 corresponds to the 6 input fields: emissions, initial concentrations, east-west winds, north-south winds, pressure, and temperature. Each channel here is 3 dimensional, as opposed to computer vision problems (for which U-net was originally used) where each of the RGB channels is 2D. Hence, 3D convolution layers are used in the network throughout. After applying several 3D convolution layers, down sampling followed by upsampling, the network outputs a 3D tensor corresponding to the change in the $CO_2$ concentrations after one day. The change in concentrations was used as the target for computing the loss function as it allows for more sensitivity in learning.

The 5 different physical quantities in the surrogate model's input: emissions, initial concentrations, winds, pressure, and temperature have completely different scales and distributions. For training of a neural network model, it is important for all features to have similar scales and distributions, usually in the range [−1, 1] or [0, 1]. Hence, each input quantity and the target output are rescaled to make their range of values similar, mostly between 0 and 1. Most emission/sink magnitudes lie between $1e^{-11}$ and $\sim 1e^{-8}$ (kg/m$^2$/sec), so log scaling followed by normalization by a factor of 3 is used. This is done while preserving the signs (so that there is a clear segregation of sources and sinks). The values were then re-centered to 0.5 to bring most of the values in the range [0, 1]. Most east-west winds lie between −15 and 15 m/s and north-south winds between −10 and 10 m/s, so they are scaled down by 15 and 10 respectively and then recentered to 0.5. After some experimentation, the cells are set with pressure less than 100 Pascals to 0, and then using log scaling followed by normalization by 3. For temperature, min-max scaling was performed according to equation 1. This scales the whole range to [0, 1]. $T_{max}$ and $T_{min}$ are 310K and 180K, respectively. For the target output (change in concentration), after some experimentation with linear scaling, it was observed that multiplying by 10.0 and recentering to 0.5 gives relatively better results.

$$T_{scaled} = \frac{T - T_{min}}{T_{max} - T_{min}} \tag{1}$$

Other details of the network training are:

1. Boundary Conditions: Most horizontal winds have magnitudes below around 15 m/s, so in 24 hours, a cell will be affected mostly by concentrations about 1300 km away from itself in any direction which corresponds to the distance covered by 3 cells for the grid resolution considered in experiments. So, while the output of the network is of the shape 47×16×16, in order to account for the lack of boundary conditions, only the values in the central 47×10×10 cells were used for the computation of the loss function (alternatively referred to as error) and hence for the training.
2. Loss function: If the correct concentration changes obtained from the transport model (over the 3D grid and inside the 10×10 horizontal region) are T and the corresponding predicted concentration changes from the surrogate model are P, then the loss function or the error is determined according to equation 2. It is essentially a ratio of the mean squared error (MSE) in the change in concentrations divided by the mean squared value of the target concentration change. Also, this function was computed in terms of concentrations themselves for comparison.

$$\text{loss} = \frac{\sum (T_i - P_i)^2}{\sum T_i^2} \tag{2}$$

3. Miscellaneous: Batch Size is 4. 3D Convolution Kernel Size is 3×3×3. Model Size is ~7.6 million parameters. Model weights are initialized using Kaiming-normal/He Initialization technique. Activation function used is ReLU function. Optimizer used is Adam optimizer. Learning Rate is 0.001 and number of epochs of training is 50.

In the generation of training dataset, each 1-year GEOS-Chem simulation gave rise to 365 samples; one sample belonging to each day. Among them, 61 days in the year were picked at random and all samples belonging to those days were used for the validation of the trained surrogate model. Samples belonging to the rest of the days were used for training. In order to assess the accuracy of the surrogate model, the following metrics were computed:

1. Validation loss is computed according to equation 2 using the validation data in terms of the concentrations and the change in concentrations.
2. Validation metric (average error in predicted concentrations in ppm): For a validation sample, if IC is the initial concentration, P is the predicted change in concentrations and TC is the target concentrations (all three in parts per million, ppm), then the Root Mean Square (RMS) of TC−(IC+P) is the error in the predicted concentration in ppm and this is monitored during training.
3. Pearson's Correlation Coefficient, both in terms of the concentrations and change in concentrations. It is defined by equation 3, wherein $f_i$ is predicted concentration by the surrogate model, $y_i$ is actual concentration obtained from the transport model, $\bar{f}$ and $\bar{y}$ are corresponding means.

$$r = \frac{\sum(f_i - \bar{f})(y_i - \bar{y})}{\sqrt{\sum(f_i - \bar{f})^2 \cdot (y_i - \bar{y})^2}} \quad (3)$$

4. Coefficient of Determination (R): It is an indicator of how well the model explains the proportion of the target's total variation. It is calculated by equation 4.

$$R^2 = 1 - \frac{\sum(y_i - f_i)^2}{\sum(y_i - \bar{y})^2} \quad (4)$$

5. Slope of the best-fit line of the scatter plot between the predicted and target values. This was done in terms of both concentrations and the change in concentrations (illustrated in FIGS. 8A and 8B).

The values of all the above accuracy measures are summarized in Table 1. The losses in terms of change in concentrations are smaller than those corresponding to the concentrations by a factor around 1000. This is simply because the average magnitude of the change in concentrations is smaller than the average concentrations by an order of 3 or more. It can be seen from the table that the model has a fairly low validation loss for concentrations. The correlation between the target and predicted values is high and the surrogate model is able to explain 75.1% of the variance in the data (which comprises of a large number of values, of the order $10^6$).

TABLE 1

| Quantity | Concentrations | Change in Concentrations |
|---|---|---|
| Training Loss(after 50 epochs) | 0.000089 | 0.107 |
| Validation Loss (after 50 epochs) | 0.0004 | 0.4794 |
| Average Error in Concentration Change (ppm) | 0.104 | NA |
| Slope of Best Fit Line | 0.993 | 0.624 |
| Pearson Correlation Coefficient | 0.996 | 0.885 |
| Coefficient of Determination | 0.992 | 0.751 |

Figure 9:
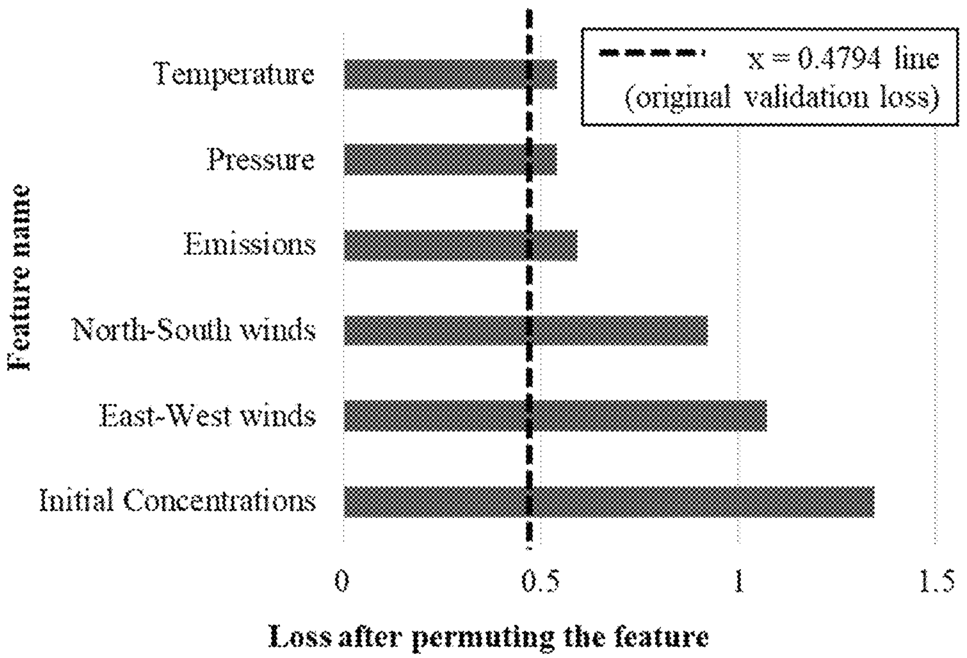
FIG. 9 illustrates permutation feature importance, according to some embodiments of the present disclosure.

In addition, outputs and loss were computed for a few samples from the year 2020. The loss averaged over all the 365 days is about 0.4921 which is not too far from the original validation loss, 0.4794. This is a positive indication of the model's generalizability to unseen conditions (since it was trained only on the conditions in 2019). Overall, all the different measures of accuracy illustrate the fair bit of learning the model has done, but at the same time the scatter plot and the validation loss for the change in concentrations indicate that there is still a noticeable gap in accuracy that it has not bridged. Further insight into the model's performance can be gained by computing the Permutation Feature Importance. It is a technique that can be used to evaluate the relative importance of different input features in the model's predictions. For a given feature it is calculated by first permuting the feature values between the validation samples, keeping all other features and output in their correct place. Then the predictions of the network are obtained on these modified samples. Permuting the values of a feature effectively disrupts the relationship between it and the target variable, resulting in a higher loss. The larger the increase in the loss compared to the 'original' loss, the higher is the importance of the feature and vice versa. The permutation feature importance was determined for the 6 input features: emissions, initial concentrations, east-west winds, north-south winds, pressure, and temperature. The results are illustrated in FIG. 9. It can be observed that the initial concentrations given to the model is the most important feature by far in predicting the change in concentrations one day into the future. The horizontal winds are the second most important which is also intuitive since advection is the only process that is used for training the model for and so (apart from emissions) it solely determines the time evolution of the gas. However, emissions seem to have much less importance may be because even though it is counted as a separate feature, emissions are still only 2 dimensional; all the other features are 3D, the third dimension being vertical height. Hence, emissions have 47 times less values and simply because of that, the impact of permuting emissions on the loss will be reduced significantly.

Method 200 is implemented with the trained surrogate model. Initial emission distribution (also referred to as prior emissions) is obtained by taking monthly averaged ODIAC CO2 emissions for July 2018 over Asia region, then it is aggregated to the resolution of 4°×5°. The surrogate model takes these prior emissions and the MERRA-2 meteorological data (namely winds, pressure, and temperature) for 1 Jul. 2018 and predicts the 3D concentrations (in ppm) for 2 Jul. 2018. The 3D concentrations are converted to total-column concentrations using the OCO-2 averaging kernels corresponding to 2 Jul. 2018. The predicted total-column concentrations are compared with the OCO-2 measurements (satellite data) for 2 Jul. 2018 and the error/loss is backpropagated to the emission values to update the prior emissions. The loss/error is determined according to equation 2. Based on the updated emissions, the surrogate model again predicts the 3D concentrations for $2^{nd}$ July and so on. These iterations are performed 200 times, i.e., the emissions for 1 Jul. 2018 are updated 200 times so that their consistency with satellite measurements from $2^{nd}$ July keeps improving and the error keeps decreasing. To analyze the results of this process under different constraints on the emissions grid, 3 experiments were conducted.

Experiment 1: No Constraints on Emissions-After running step 204 of the method 200 for 200 iterations with no constraints on the emission values, the value of the loss is 0.091495, which implies that with the corrected emissions the RMS error with satellite data is about 9%. An increase in the emissions of the hotspots in China and India were observed, while at the same time cells with negligible emissions in the prior are turned into (very weak) sinks, notably over the Indian Ocean. This makes intuitive sense since oceans can be sink for CO2. The total (corrected) emissions from the whole 16×16 region is about 185.015 Gt (Gigatons) per year.

Experiment 2: Ocean Emissions Held Fixed—In this experiment, the emissions of the cells over the seas/ocean are fixed to their prior values, which for ODIAC is 0. The idea is to let the inversion process (step 204) focus more on the terrestrial emissions and not get confused by regions occupied by the oceans (since ODIAC is also solely terrestrial emissions). The final loss after 200 iterations is 0.091496. The distribution is qualitatively similar to the one obtained from experiment 1 with slightly less extreme emissions. The total emission from the region is about 181.047 Gt per year.

Experiment 3: Terrestrial Emissions restricted to 10% Variability—In this experiment, the ocean emissions are fixed as in experiment 2 and the terrestrial emissions are restricted to 10% variability. The final value of the loss is 0.091512. While the distribution again looks qualitatively similar to other experiments, the emission magnitudes are significantly lesser. This is confirmed in the total emissions of the region: 60.262 Gt per year.

From the above 3 experiments, it can be seen that the results are in reasonable consistency between the surrogate model's predictions and satellite data in all experiments. But at the same time, the consistency reduces (very slightly) as more constraints are imposed on the emissions. This is expected since with more constraints the model has a smaller parameter space to work with and minimize the loss.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

obtaining, via one or more hardware processors, i) an initial estimate of emission distribution of a gas over an area, ii) a plurality of meteorological conditions of the area, iii) a plurality of prior concentrations of the gas, and iv) a satellite data of current concentration of the gas over the area; and updating, via the one or more hardware processors, the initial estimate of emission distribution of the gas in a plurality of iterations until a computed error value between a predicted concentration of the gas by a surrogate model and the satellite data of current concentration of the gas is less than a predefined threshold value, wherein a final estimate of emission distribution of the gas is obtained after the plurality of iterations, and wherein at each of the plurality of iterations the initial estimate of emission distribution of the gas is updated by:

predicting the concentration of the gas based on an emission distribution of the gas, the plurality of meteorological conditions, and the plurality of prior concentrations of the gas, using the surrogate model, wherein the emission distribution of the gas is equal to the initial estimate of emission distribution in a first iteration, wherein the surrogate model comprises a deep neural network trained to approximate behavior of a transport model, wherein the predicted concentration is generated over a three-dimensional grid, wherein the predicted concentration over the three-dimensional grid is converted into total-column concentration using vertical averaging kernels corresponding to the satellite data, wherein the total-column concentration is a two-dimensional grid;

computing the error value between the predicted concentration of the gas and the satellite data of current concentration of the gas, wherein the computed error value is based on a loss function that is a ratio of a mean squared error (MSE) in the change in concentrations divided by a mean squared value of the target concentration change; and updating the initial estimate of emission distribution based on the computed error value, wherein the updated estimate of emission distribution is used in subsequent iteration, wherein updating the initial estimate comprises back-propagating the computed error value to the emission distribution to iteratively correct the emission distribution, wherein the updating is performed as part of a dual optimization scheme that trains a surrogate of the transport model and simultaneously corrects the prior emissions, thereby reducing inaccuracies of atmospheric transport model in order to minimize the loss.

2. The method of claim 1, wherein the surrogate model is trained by:

obtaining a plurality of future concentrations of the gas in a region by simulating a transport model with a plurality of the meteorological conditions of the region, a plurality of the emission distributions of the gas in the region and a plurality of past concentrations of the gas in the region;

predicting a plurality of concentrations of the gas using the surrogate model based on the plurality of emission distributions of the gas, the plurality of meteorological conditions, and the plurality of past concentrations of the gas; and training the surrogate model by updating weights of the surrogate model using a backpropagation technique based on an error between the plurality of concentrations predicted by the surrogate model and the plurality of future concentrations of the gas obtained from the transport model, wherein the plurality of future concentrations is obtained by simulating the transport model.

3. The method of claim 1, wherein the final estimate of emission distribution of the gas is transformed into a high-resolution emission distribution by using a low resolution to high resolution converter, wherein the low resolution to high resolution converter comprises a deep neural network as an autoencoder to reconstruct high-resolution emission distributions from low-resolution emission distributions.

4. The method of claim 3, wherein the low-resolution to high-resolution converter is obtained by:

obtaining a dataset of high-resolution emissions;

generating a dataset of low-resolution emissions from the dataset of high-resolution emissions by mean-pooling; and training a deep learning model using the dataset of high-resolution emissions and the dataset of low-resolution emissions to obtain the low-resolution to high-resolution converter, wherein generating the dataset of low-resolution emissions comprises mean-pooling values of a high-resolution emission grid to obtain a corresponding low-resolution grid.

5. A system comprising:

a memory storing instructions;

one or more Input/Output (I/O) interfaces; and one or more hardware processors coupled to the memory via the one or more communication interfaces (106), wherein the one or more hardware processors are configured by the instructions to:

obtain i) an initial estimate of emission distribution of a gas over an area, ii) a plurality of meteorological conditions of the area, iii) a plurality of prior concentrations of the gas, and iv) a satellite data of current concentration of the gas over the area; and update the initial estimate of emission distribution of the gas in a plurality of iterations until a computed error value between a predicted concentration of the gas by a surrogate model and the satellite data of current concentration of the gas is less than a predefined threshold value, wherein a final estimate of emission distribution of the gas is obtained after the plurality of iterations, and wherein at each of the plurality of iterations the initial estimate of emission distribution of the gas is updated by:

predicting the concentration of the gas based on an emission distribution of the gas, the plurality of meteorological conditions, and the plurality of prior concentrations of the gas, using the surrogate model, wherein the emission distribution of the gas is equal to the initial estimate of emission distribution in a first iteration, wherein the surrogate model comprises a deep neural network trained to approximate behavior of a transport model, wherein the predicted concentration is generated over a three-dimensional grid, wherein the predicted concentration over the three-dimensional grid is converted into total-column concentration using vertical averaging kernels corresponding to the satellite data, wherein the total-column concentration is a two-dimensional grid;

computing the error value between the predicted concentration of the gas and the satellite data of current concentration of the gas, wherein the computed error value is based on a loss function that is a ratio of a mean squared error (MSE) in the change in concentrations divided by a mean squared value of the target concentration change; and updating the initial estimate of emission distribution based on the computed error value, wherein the updated estimate of emission distribution is used in subsequent iteration, wherein updating the initial estimate comprises backpropagating the computed error value to the emission distribution to iteratively correct the emission distribution, wherein the updating is performed as part of a dual optimization scheme that trains a surrogate of the transport model and simultaneously corrects the prior emissions, thereby reducing inaccuracies of atmospheric transport model in order to minimize the loss.

6. The system of claim 5, wherein the one or more hardware processors are configured by the instructions to train the surrogate model by:

obtaining a plurality of future concentrations of the gas in a region by simulating a transport model with a plurality of the meteorological conditions of the region, a plurality of the emission distributions of the gas in the region and a plurality of past concentrations of the gas in the region;

predicting a plurality of concentrations of the gas using the surrogate model based on the plurality of emission distributions of the gas, the plurality of meteorological conditions, and the plurality of past concentrations of the gas; and training the surrogate model by updating weights of the surrogate model using a backpropagation technique based on an error between the plurality of concentrations predicted by the surrogate model and the plurality of future concentrations of the gas obtained from the transport model, wherein the plurality of future concentrations is obtained by simulating the transport model.

7. The system of claim 5, wherein the final estimate of emission distribution of the gas is transformed into a high-resolution emission distribution by using a low resolution to high resolution converter, wherein the low resolution to high resolution converter comprises a deep neural network as an autoencoder to reconstruct high-resolution emission distributions from low-resolution emission distributions.

8. The system of claim 7, wherein the low-resolution to high-resolution converter is obtained by:

obtaining a dataset of high-resolution emissions;

generating a dataset of low-resolution emissions from the dataset of high-resolution emissions by mean-pooling; and training a deep learning model using the dataset of high-resolution emissions and the dataset of low-resolution emissions to obtain the low-resolution to high-resolution converter, wherein generating the dataset of low-resolution emissions comprises mean-pooling values of a high-resolution emission grid to obtain a corresponding low-resolution grid.

9. One or more non-transitory machine-readable information storage mediums comprising one or more instructions which when executed by one or more hardware processors cause:

obtaining i) an initial estimate of emission distribution of a gas over an area, ii) a plurality of meteorological conditions of the area, iii) a plurality of prior concentrations of the gas, and iv) a satellite data of current concentration of the gas over the area; and updating the initial estimate of emission distribution of the gas in a plurality of iterations until a computed error value between a predicted concentration of the gas by a surrogate model and the satellite data of current concentration of the gas is less than a predefined threshold value, wherein a final estimate of emission distribution of the gas is obtained after the plurality of iterations, and wherein at each of the plurality of iterations the initial estimate of emission distribution of the gas is updated by:

predicting the concentration of the gas based on an emission distribution of the gas, the plurality of meteorological conditions, and the plurality of prior concentrations of the gas, using the surrogate model, wherein the emission distribution of the gas is equal to the initial estimate of emission distribution in a first iteration, wherein the surrogate model comprises a deep neural network trained to approximate behavior of a transport model, wherein the predicted concentration is generated over a three-dimensional grid, wherein the predicted concentration over the three-dimensional grid is converted into total-column concentration using vertical averaging kernels corresponding to the satellite data, wherein the total-column concentration is a two-dimensional grid;

computing the error value between the predicted concentration of the gas and the satellite data of current concentration of the gas, wherein the computed error value is based on a loss function that is a ratio of a mean squared error (MSE) in the change in concentrations divided by a mean squared value of the target concentration change; and updating the initial estimate of emission distribution based on the computed error value, wherein the updated estimate of emission distribution is used in subsequent iteration, wherein updating the initial estimate comprises backpropagating the computed error value to the emission distribution to iteratively correct the emission distribution, wherein the updating is performed as part of a dual optimization scheme that trains a surrogate of the transport model and simultaneously corrects the prior emissions, thereby reducing inaccuracies of atmospheric transport model in order to minimize the loss.

10. The one or more non-transitory machine-readable information storage mediums of claim 9, wherein the surrogate model is trained by:

obtaining a plurality of future concentrations of the gas in a region by simulating a transport model with a plurality of the meteorological conditions of the region, a plurality of the emission distributions of the gas in the region and a plurality of past concentrations of the gas in the region;

predicting a plurality of concentrations of the gas using the surrogate model based on the plurality of emission distributions of the gas, the plurality of meteorological conditions, and the plurality of past concentrations of the gas; and training the surrogate model by updating weights of the surrogate model using a backpropagation technique based on an error between the plurality of concentrations predicted by the surrogate model and the plurality of future concentrations of the gas obtained from the transport model, wherein the plurality of future concentrations is obtained by simulating the transport model.

11. The one or more non-transitory machine-readable information storage mediums of claim 9, wherein the final estimate of emission distribution of the gas is transformed into a high-resolution emission distribution by using a low resolution to high resolution converter, wherein the low resolution to high resolution converter comprises a deep neural network as an autoencoder to reconstruct high-resolution emission distributions from low-resolution emission distributions.

12. The one or more non-transitory machine-readable information storage mediums of claim 11, wherein the low-resolution to high-resolution converter is obtained by:

obtaining a dataset of high-resolution emissions;

generating a dataset of low-resolution emissions from the dataset of high-resolution emissions by mean-pooling; and training a deep learning model using the dataset of high-resolution emissions and the dataset of low-resolution emissions to obtain the low-resolution to high-resolution converter, wherein generating the dataset of low-resolution emissions comprises mean-pooling values of a high-resolution emission grid to obtain a corresponding low-resolution grid.

* * * * *